(12) United States Patent
Doucette et al.

(10) Patent No.: US 6,272,073 B1
(45) Date of Patent: Aug. 7, 2001

(54) UNDERWATER LOCATION AND COMMUNICATION DEVICE

(76) Inventors: Gary L. Doucette, 4253 Tazewell Ter., Burtonsville, MD (US) 20866;
Matthew C. Rivotto, 503 Anderson Dr., Lake in the Hills, IL (US) 60102

( * ) Notice: Subject to any disclaimer, the term of this patent is extended or adjusted under 35 U.S.C. 154(b) by 0 days.

(21) Appl. No.: 09/197,150

(22) Filed: Nov. 20, 1998

(51) Int. Cl.[7] .................................................. H04B 11/00
(52) U.S. Cl. ............................................ 367/131; 134/127
(58) Field of Search ................................. 367/134, 131, 367/6, 127

(56) References Cited

U.S. PATENT DOCUMENTS

| | | |
|---|---|---|
| 3,587,038 | 6/1971 | Massa, Jr. . |
| 3,986,161 | 10/1976 | Mackellar . |
| 4,574,368 | 3/1986 | Lipschutz . |
| 4,635,242 * | 1/1987 | Hart ....................................... 367/134 |
| 4,899,135 | 2/1990 | Ghahariiran . |
| 4,935,907 | 6/1990 | Friedman . |
| 5,077,703 | 12/1991 | Strauss . |
| 5,185,725 | 2/1993 | Kent et al. . |
| 5,303,206 | 4/1994 | Bemb et al. . |
| 5,570,323 | 10/1996 | Prichard et al. . |
| 5,666,326 | 9/1997 | Holzschuh . |
| 5,784,339 * | 7/1998 | Woodsum et al. .................... 367/134 |

\* cited by examiner

*Primary Examiner*—Daniel T. Pihulic
(74) *Attorney, Agent, or Firm*—Oldham & Oldham Co. LPA

(57) ABSTRACT

An electronic device for use by recreational divers, that uses ultrasonic signals to measure distance, to indicate relative direction, and to maintain contact between at least two diving partners during a diving session. One of the devices is worn and operated by each diving partner, and each device, through an arrangement of ultrasound transmitters and receiver pairs affixed thereto, monitors relative distance between itself and each other device in use by a diving partner. The device has a user interface, including a plurality of push-buttons and liquid crystal display, to set and indicate relative distance, relative direction, low battery fault, and chime or vibration warning mode. The warning mode alerts a diver when a distance limit between companion divers has been exceeded.

30 Claims, 4 Drawing Sheets

UNDERWATER LOCATION AND COMMUNICATION DEVICE

FIELD OF THE INVENTION

The present invention relates to underwater location and communication devices, and more specifically, to a device for use by recreational divers, that uses ultrasonic signals to measure distance, to indicate relative direction, and to maintain contact between diving partners during a diving session.

BACKGROUND OF THE INVENTION

A review of diving accident reports has shown that a majority of diving accidents occurs when a diver is out of contact with his or her diving partner or partners. Therefore, from a safety perspective, the availability of a compact, light weight, easily worn, and highly reliable means of contact between divers can help to greatly reduce the incidence of mishaps and fatalities sustained during underwater recreational activities.

The art includes a number of devices aimed at enhancing communication and navigational abilities for divers. Among such devices are those disclosed in U.S. Pat. Nos. 5,077,703 and 5,185,725.

U.S. Pat. No. 5,077,703 discloses a device that uses microwaves, radio waves, or the like to indicate the direction and distance between a diver and a home base transmitter. The home base transmitter creates a signal of a prescribed frequency. The diver wears the device on his or her wrist, similar to a watch. Upon receipt of the signals, the receiver indicates the direction of the base. The receiver also has a range indicator that will warn the diver when he or she has exceeded a prescribed distance from the home base.

U.S. Pat. No. 5,185,725 discloses an invention wherein a system of locator modules determine the range and bearing of the other modules in the system by sending out acoustic pulses. A diver carries a module that measures the range and bearing of other modules mounted on a boat or other underwater location. A console carried by the diver displays the information.

While the above described devices and others known in the art have desirable capabilities, the present invention affords divers a device having even greater safety features, including alerting the diver(s) when a preselected range limit from other divers in the group is exceeded.

SUMMARY OF THE INVENTION

The present invention is an ultrasonic transceiver (transmitter/receiver). As ultrasound is a popular method of underwater communication, the device of the present invention employs ultrasound to monitor relative distance between itself and other similar units. The device has a user interface to set and indicate relative distance, relative direction, low battery fault, and chime or vibration indicating mode. The unit is housed in a durable plastic, water proof case. The device runs on two coin cell batteries that are accessible via a rear panel battery compartment.

The device turns on and off by depressing a power push-button switch. This switch may be used to reset the unit in the event of a fault condition.

A range push-button switch sets a range limit. Current range limit, in feet, and approximate direction are indicated by a Liquid Crystal Display (LCD).

When the range limit is exceeded, the device will alert the diver with either an audible tone or a vibration. The desired alarm indicator may be selected by a warning indicator push-button switch. An active alarm indicator is displayed on the LCD.

To communicate effectively, and prevent interference from other groups using the same device, the device can be set to operate on different channels. A Ch/D push-button switch facilitates this function. The current channel of operation is shown on the LCD.

To allow co-channel operation with multiple units, the user must identify which device in the group his/her unit is. This is accomplished by selecting a device number (1 through 8) with the Ch/D push-button switch.

The battery compartment is on the rear panel and houses two coin cell batteries. A belt clip is also located on the rear panel. It allows the diver to fasten the device to a belt or other suitable clothing. An optional Velcro strap may be used to attach the device to the diver.

On all sides of the device except the rear panel, a pair of piezoelectric transducers are provided. In each pair, one is the transmitter and the other is the receiver. These transmitter/receiver pairs allow the devices of the present invention to communicate with each other.

DETAILED DESCRIPTION OF THE PREFERRED EMBODIMENT

Figure 1:
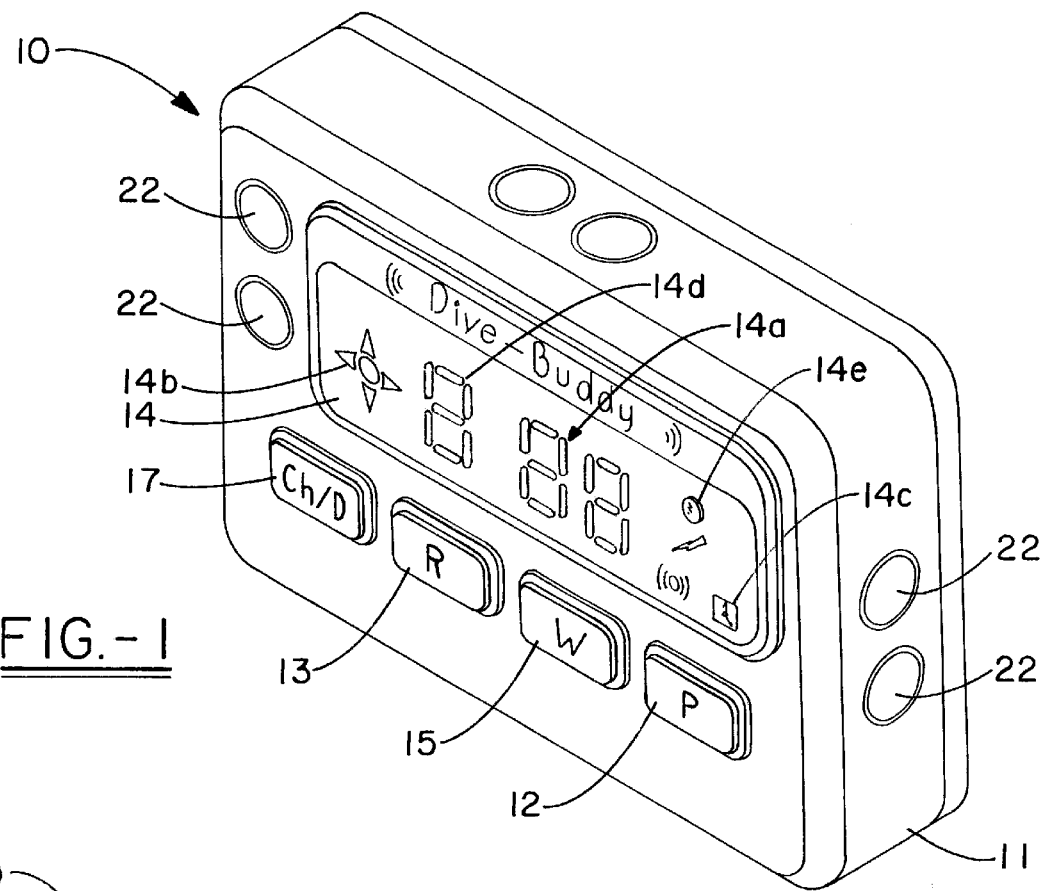
FIG. 1 is a perspective external view of a first embodiment of the device of the present invention.
Figure 2:
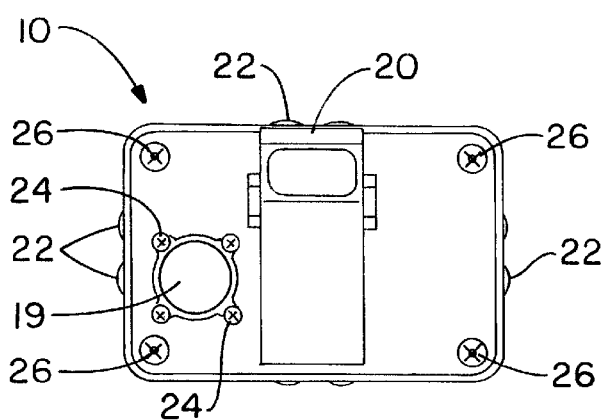
FIG. 2 is a back elevation view of the embodiment of the device as seen in FIG. 1.
Figure 3:
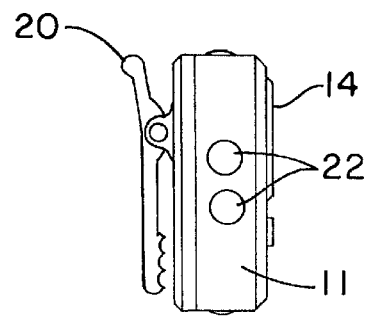
FIG. 3 is a side view of the device as seen in FIG. 1.
Figure 4:
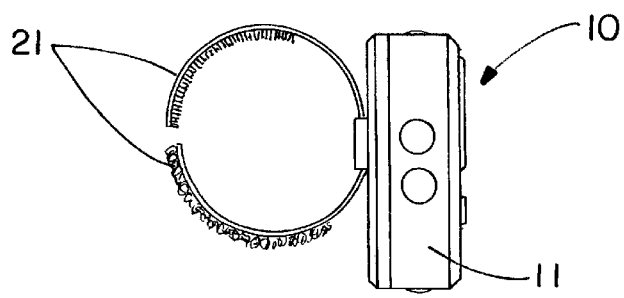
FIG. 4 is a side external view of the device according to another embodiment of the present invention.

An underwater location and communication device in accordance with the present invention is indicated in FIG. 1 by the reference numeral 10. As will be noted in FIG. 1, the device 10 has a box-like external appearance and is broadly comprised of: a durable, water proof outer case or housing 11 that is made of high strength plastic or any other sound material; a group of push-button switches 12, 13, 15 and 17 that is located on a front panel of the device 10 and are used by a diver to operate the device 10; a liquid crystal display 14 that is also situated on a front panel of the device 10 and that provides informational data to the diver; a belt clip 20 that is fastened to a rear panel of the device 10 and serves as a means by which the device 10 is worn by the diver; and a plurality of ultrasonic transmitter/receiver pairs 22. As is more clearly shown by reference to FIGS. 1 and 2, a transmitter/receiver pair 22 is provided on all panels (top, bottom, left, right and front) except for the rear panel of the device 10. The device 10 is electrically powered by coin-like cell batteries (shown in FIG. 4) that are stored in a battery compartment (not shown) provided inside housing 11. As shown in FIG. 4, which provides a view of the rear panel of the device 10, a generally circular cover plate 19 is provided over a rear panel aperture that serves as a means of access to the battery compartment. The cover plate 19 is kept firmly in place over the rear panel aperture by a plurality of screws 24 or other suitable known fastening means. The rear panel of the housing 11 is made removable from the device by a bore provided at each corner of the rear panel and that receives a screw 26 for threadably engaging the housing 11.

FIG. 1 shows that the push-buttons 12, 13, 15 and 17 are horizontally aligned in the bottom half of the front panel of the housing 11. The power push-button switch 12, which is marked with a letter "P", serves to turn power to the device 10 on or off by depressing. The switch 12 also serves to reset the device 10 in the event of a fault condition. The range push-button switch 13, which is designated with a letter "R", operates to let a diver set a desired range or distance limit between the device 10 and other such devices being used by other members of the diver's diving group. The warning indicator push-button switch 15 allows the diver to select the warning or alert mode that the device 10 will employ in the event that the range set by use of the range push-button switch 13 is exceeded. Two warning modes, either an audible tone or a vibration, may be selected by the diver. Lastly, a Ch/D push-button switch 17 is provided to allow a channel of operation to be selected for the device 10. Channel changing capability is provided so that interference may be prevented from any other nearby diving groups who may be using the same type of location and communication apparatus.

The liquid crystal display 14 provides the diver with informational readouts that relate not only to the above described push-button functions, but also to the positional status of any other device 10 in use by a diving partner. As also shown in FIG. 1, the display 14 has a range readout 14a and a direction readout 14b. When the device 10 is in operation, the range readout 14a registers the the current range limit selected with the range push-button switch 13, and the direction readout 14b indicates approximate direction of other diving partners having a device 10 in operation. The display 14 also has an active alarm readout 14c that is displayed when warning push-button switch 15 has been used to select one of the two alarm modes. Operating channel selected with Ch/D push-button switch 17 is registered on Ch/D readout 14d. Display 14 is also provided with a low-battery readout 14e that becomes visible when the power level of the batteries diminishes below a predetermined level.

In addition to the above described predominantly external features that comprise the device 10 of the present invention, certain internal electronic means also contribute to the unique capabilities of the present invention. Such means, which are shown schematically in FIG. 5, include a microcontroller circuit 30 and an ultrasonic transceiver circuit 40. The microcontroller circuit 30 includes an Integrated Circuit (IC), U1, that is a microcontroller based upon the 8051 family of microcontrollers. The microcontroller U1 serves as a low cost solution for handling all the complex operations of the present invention. The microcontroller U1 sets up the operation parameters for a LCD driver U2, an analog MUX U7 and an adaptive band pass filter U8. (U7 and U8 are shown in transceiver circuit 40.) The microcontroller U1 generates the carrier frequency of operation, provides a user interface, activates the warning indicators, and establishes the communication frame work of the present invention.

Figure 6:
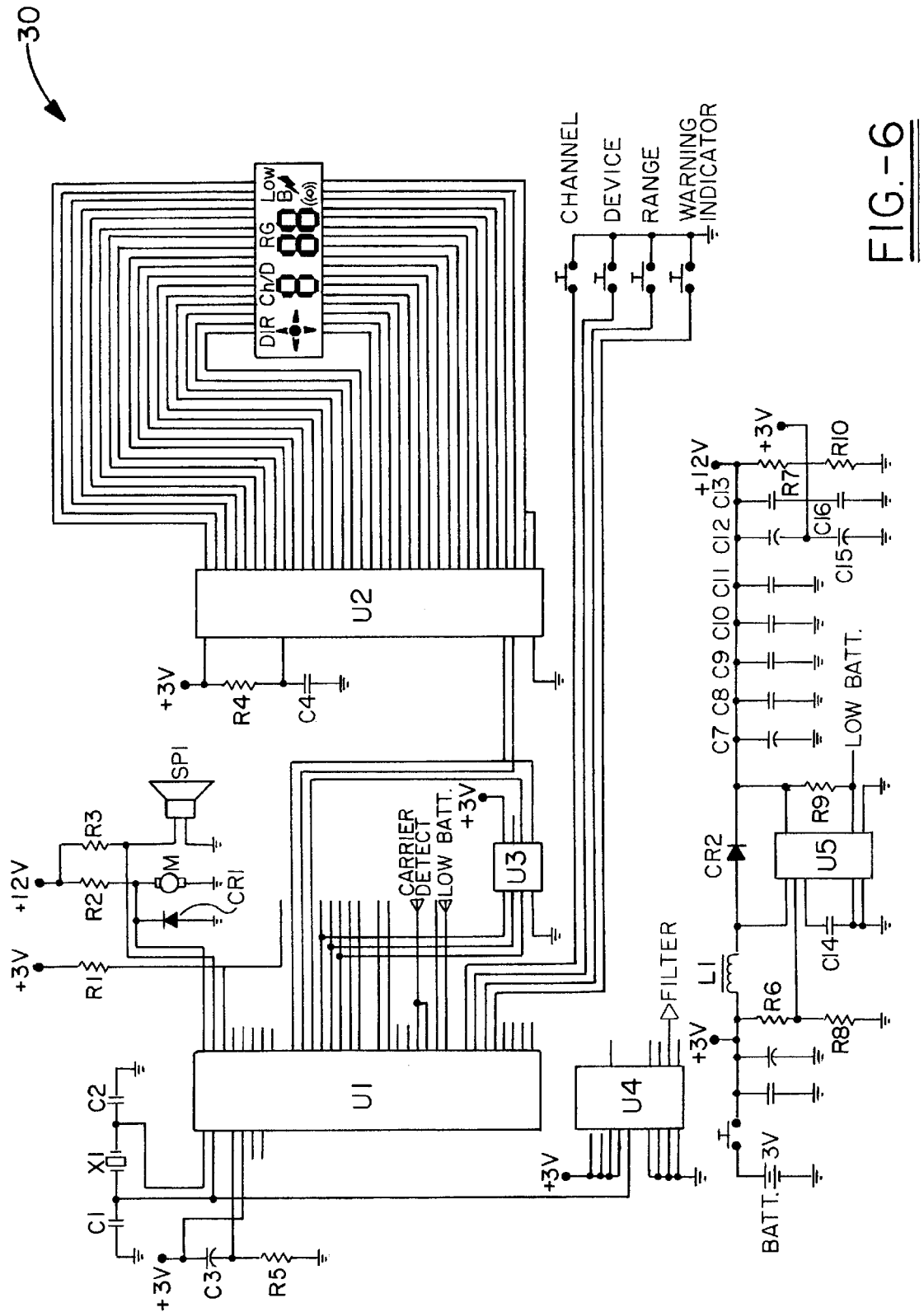
FIG. 6 is a schematic circuit diagram of the microcontroller circuitry of the present invention.

As previously stated, the present invention uses ultrasound to determine distance between the devices 10. The microcontroller U1 generates the desired carrier frequency by toggling pin 41 (shown in FIG. 6) on and off at the selected rate. Encoded on this carrier frequency are the device numbers of the querying device 10 and another device 10. All the other co-channel devices 10 will receive this signal, but only the device 10 identified by this device number will respond. The distance between the querying device 10 and the responding device 10 is correlated by the amount of time it takes for the querying device 10 to receive a signal from the responding device 10. Each co-channel device 10 queries all the other co-channel device's 10 on an individual basis for distance measurement.

The liquid crystal display 14, is controlled by the LCD driver U2, and LCD driver IC. The liquid crystal display 14 indicates range limit 14a, device number 14d and approximate direction 14b of a communicating co-channel device 10, low battery warning 14e, and warning indication type 14c. The liquid crystal display 14 has electro-luminescent back lighting to illuminate the display 14 in low ambient light.

The LCD driver U2 is programmed by microcontroller U1 to display the operating parameters of the device 10.

The vibration indicator circuitry (FIG. 6) is comprised of a diode CR1, a DC motor M1 and a resistor R2. The motor M1 is activated when a pin 43 of the microcontoller U1 outputs a logic 1. The pin 43 is set when the range limit set by the range push-button switch 13 is exceeded and vibration mode is selected by the warning indicator push-button switch 15. A resistor R1 limits the current through the motor M1, and a capacitor C1 protects the microcontroller by shunting the reverse electromotive force generated when the motor M1 is turned off.

A speaker SP1 and resistor a R3 make up the audible alarm. Speaker SP1 is a piezoelectric speaker, and it generates a tone when a pin 42 of the microcontoller U1 toggles between a logic 1 and a logic 0. The pin 42 will activate when the range limit is exceeded and audible alarm is selected. The speaker SP1 will also generate a tone when the device 10 is first turned on to indicate that the device 10 is operational.

Figure 5:
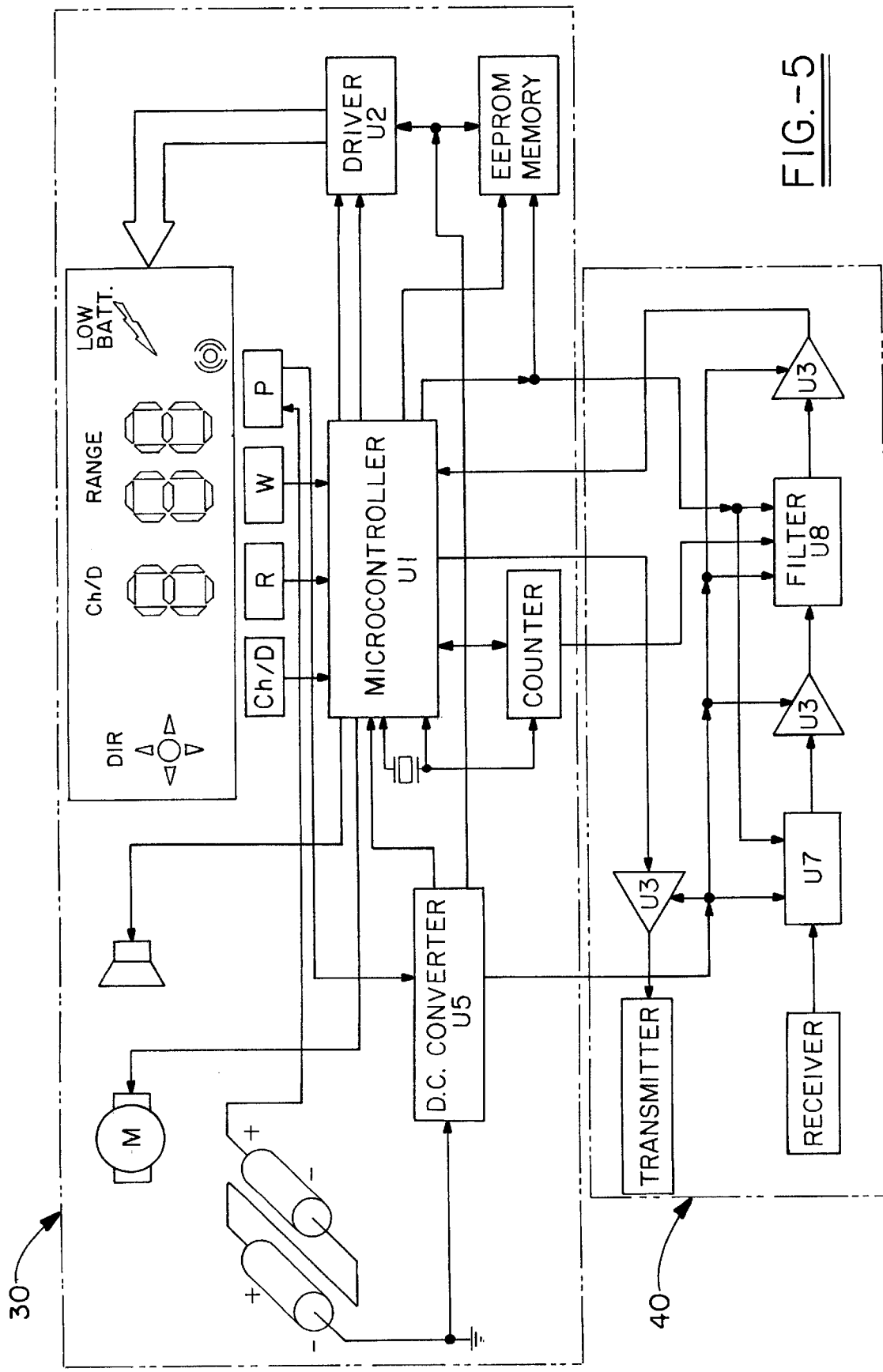
FIG. 5 is a schematic block diagram of operational components of the present invention.
Figure 7:
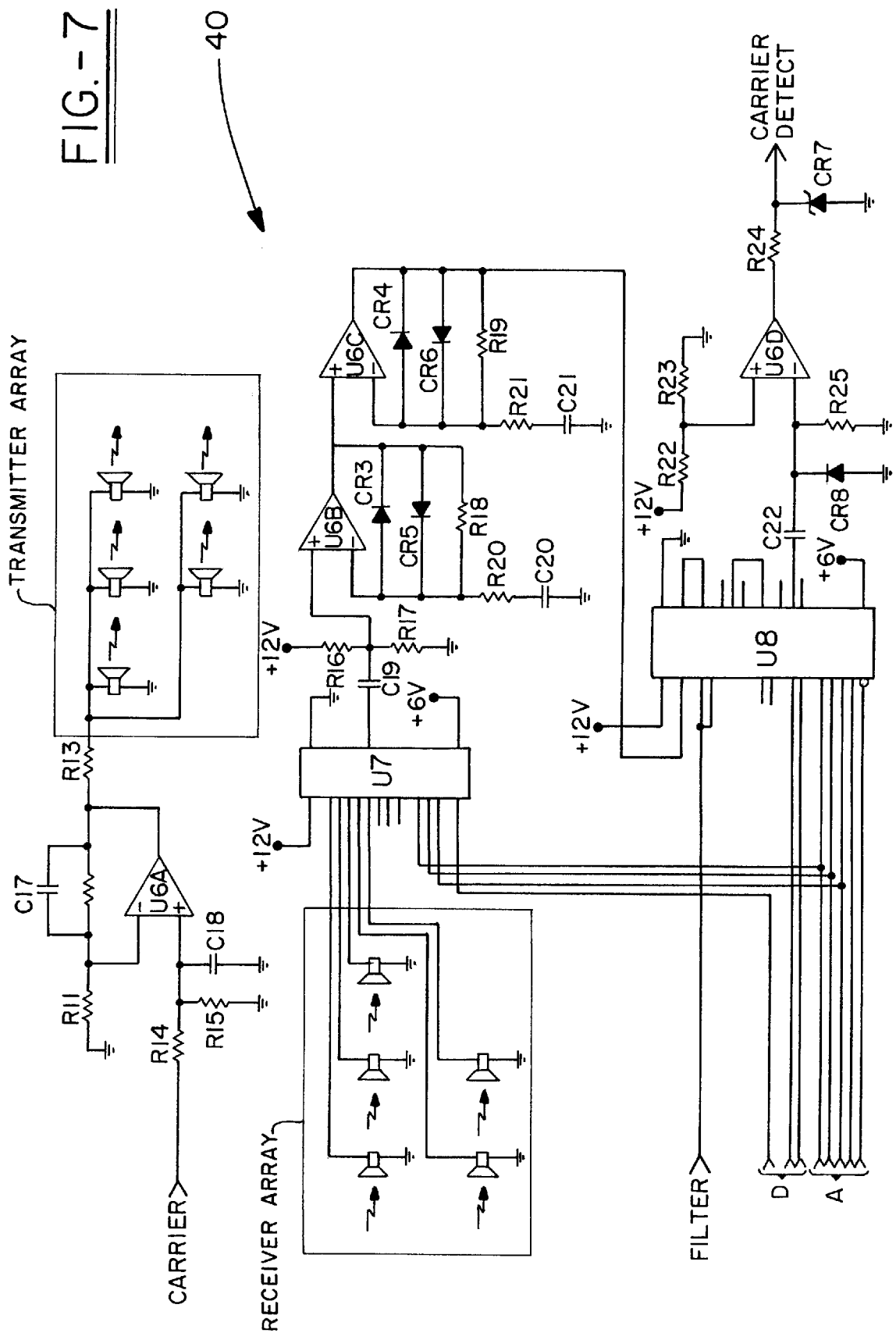
FIG. 7 is a schematic circuit diagram of transceiver circuitry of the present invention.

An Electronically Erasable Programmable Read Only Memory (EEPROM) is shown in FIGS. 5 and 7. The EEPROM U3 stores all parameter settings of the device 10, and retains them when the device 10 is turned off (non-volatile).

A four bit binary counter U4 (FIGS. 5 and 6) divides the master clock frequency of 16 MHZ (established by capacitor C1, capacitor C2, crystal X1, and microcontroller U1) to 2 MHz. This 2 MHz signal is used to set up the sampling rate of the adaptive, bandpass filter U8.

A DC to DC converter U5, with the help of the supporting microncontroller circuit 30, boosts the +3 Vdc battery voltage to a regulated +12 Vdc. The +12 Vdc energizes the ultrasonic transceiver circuit 40.

The circuit of the ultrasonic transceiver 40 shown in FIGS. 5 and 7 illustrates the transmitter and receiver sections of the device 10.

The transmitter section is comprised of operational amplifier U6:A and a plurality of piezoelectric transducers TX1 through TX5. Amplifier U6:A amplifies a carrier signal generated by the microcontroller U1. The plurality of piezoelectric transducers TX1 through TX5 convert the amplified carrier signal to a sound wave. This sound wave will propagate through the water to the other devices 10 units for detection by their receivers.

The receiver section is comprised of: a plurality of piezoelectric transducers, RX1 through RX5; an analog multiplexer U7; a plurality of operational amplifiers, U6:B, U6:C and a U6:D; and switched capacitor, bandpass filter, U8.

In operation, the sound wave is detected by the plurality of piezoelectric transducers, RX1 through RX5. The transducers RX1 through RX5 convert the sound wave into an electrical signal. An analog multiplexer U7 under the control of the microcontroller U1, connects one of the transducer signals to the amplifier section (U6:B and U6:C). The microcontroller U1 tells multiplexer U7 to use the transducer that provides the strongest signal to amplifier U6:D. Amplifier's U6:B and U6:C provide a 400 to 1 signal amplification (gain). Automotive Gain Control (AGC) is provided by the diodes CR3 through CR6 to prevent the amplifier from saturating. The band pass filter U8 provides the adaptive filter function. It tunes the receiver to the proper channel and attenuates all other channel frequencies. Amplifier U6:D acts as a voltage comparator. It only detects carrier signals that exceed a trip level set by the resisters R22 and R23 and converts them into a digital signal for the microcontoller U1 to interpret. The diode CR7 clips this digital signal to an appropriate level for the microcontroller U1.

The microcontroller U1 contains a computer software program that controls the device 10. The software functions in accordance with the following description. Upon activation, the software of the device 10 activates both warning indicators (speaker SP1 and motor M1) and all elements 14a–14e of the liquid crystal display 14 to demonstrate that all portions of the device 10 are operational. Then the program reads the parameters stored in the EEPROM (U3) and echoes them to the liquid crystal display 14. During the first 15 seconds after power up, the program allows the diver to enter channel frequency, device number, range limit, and warning indication type. After the initial 15 seconds have expired, the program stores the new parameters in the EEPROM U3. Next the program determines how many co-channel devices 10 there are by querying each device 10. Devices 10 that respond will have their device numbers stored. This operation will take about 10 seconds to complete. Once the initialization portion is complete, the program executes normal operation of the device 10.

Each device 10 polls other co-channel Devices 10 by sending out a stream of ultrasonic pulses. Encoded in the ultrasonic pulse stream are the device numbers for the querying and responding devices 10. The device numbers are three bit binary numbers. These two device numbers are encoded into the ultrasonic pulse stream. The encoded format is 16 pulses for a logic 0 and 20 pulses for a logic 1 with a "dead time" between pulse groups to identify individual bits. The microcontroller U1 of the responding device 10 sends out a response in the same format. The amount of time it takes for the querying unit to receive a response is translated into a distance. If the distance exceeds the set range limit, a fault is registered and an alarm is activated. The software incorporates a delay which prevents the querying device 10 from responding to an echo of its own signal.

The microcontroller U1 polls each receiving transducer RX1 through RX5 to see which transducer is receiving an adequate signal for communication and locks into that transducer. The direction indicator 14b on the liquid crystal display 14 shows which of the receiving transducers RX1 through RX5 is providing detection. The transducers RX1 through RX5 are only somewhat directional, so the direction indicator 14b is not precise. It is only an approximation. The microcontroller U1 briefly polls the other receiving transducers to ensure tracking of the transmitting Device 10.

The polling sequence of the co-channel device 10 starts with device 1 talking to the device recognized as device number 2, then the device recognized as device number 3 etc. up to the device recognized as device number 8. Device number 2 performs the same polling sequence, starting with device number 1 and ending with device number 8. What effectively happens is each device 10 talks to the other devices 10 in a numerical sequence. This method of polling ensures no diver has exceeded the present range limit. If one has, all devices 10 will register a fault and activate an alarm.

The pulse stream format emitted from each device 10 will appear like the following:

<Querying Device No.><Responding Device No.>Alarm
--XXXXXX---XXXXXX---XXXXXX---XXXXXX----
XXXXXX---XXXXX----

The X's indicate carrier present. As the device number is a three bit binary number defined by ones and zeroes, it is used to modulate, or control the carrier signal. There will be either 16 carrier oscillations for a logic 0 or 20 carrier oscillations for a logic 1. The '--' indicates no carrier present. This allows the microcontroller U1 to distinguish between each bit. The "Alarm" portion of the stream functions as a means of communicating to other devices 10 that a fault has been detected. The receiving devices 10 will activate their alarms to indicate a fault to all the other divers.

On the receiver side of the device 10, the software tells the microcontroller U1 to monitor the pin 16 of U1. The software counts the number of pulses in the stream to determine the code sent. As previously stated, the pauses between the bits will help the microcontroller U1 distinguish them. After "demodulating" the carrier signal, the responding device 10 will send a similar pulse stream back to the querying device 10. Once the querying device 10 receives this signal, it will determine the distance between it and the responding device 10 by analyzing the elapsed time from transmission to reception. Again, if the limit has been exceeded, an alarm will be activated.

While the preferred embodiment of the invention have been described above, it will be recognized and understood that various modifications may be made therein and the appended claims are intended to cover all such modifications which may fall within the spirit and scope of the invention.

What is claimed is:

1. An underwater location and communication device for use by a diver, said device comprising:

an outer case or housing that is durable and waterproof;

a plurality of manually operable switches attached to said housing and used by said diver to operate said device;

an electronic display also attached to said housing and readable from the exterior of said housing by said diver;

a fastening means attached to said housing and used to permit said device to be worn by said diver;

a plurality of transmitter/receiver pairs affixed to said housing and employed to emit and intercept an ultrasonic wave;

an electric power source contained within said housing;

a plurality of warning means enclosed in said housing and employed to alert said diver when a distance limit selected by said diver between said device and a companion device worn and operated by a companion diver is exceeded;

a microcontroller circuit in electrical communication with said plurality of manually operable switches, said electronic display, said electric power source and said plurality of warning means; and a transceiver circuit in electrical communication with said plurality of transmitter/receiver pairs and said microcontroller circuit.

2. A device as claimed in claim 1, wherein said housing has a front panel, a rear panel, a top panel, a bottom panel, a left side panel and a right side panel.

3. A device as claimed in claim 2, wherein said plurality of manually operable switches are situated on said front panel of said housing.

4. A device as claimed in claim 1, wherein said plurality of manually operable switches is a plurality of push-button switches.

5. A device as claimed in claim 4, wherein said plurality of push-button switches is comprised of a first push-button switch, a second push-button switch, a third push-button switch and a fourth push-button switch.

6. A device as claimed in claim 5, wherein said first push-button switch is a power push-button switch that starts and stops a flow of an electric current from said electric power source to said electronic display, said microcontroller circuit and said transceiver circuit.

7. A device as claimed in claim 6, wherein said second push-button switch is a range push-button switch that permits said diver to select said distance limit between said device and said companion device.

8. A device as claimed in claim 5, wherein said third push-button switch is a warning indicator push-button switch that allows said diver to choose a warning means from said plurality of warning means.

9. A device as claimed in claim 5, wherein said device has a plurality of operating channels and said fourth push-button switch is an operating channel push-button switch that permits said diver to select an operating channel for said device from said plurality of operating channels.

10. A device as claimed in claim 6, wherein said power push-button switch further controls a means to reset said device in the event a fault condition occurs in said device.

11. A device as claimed in claim 1, wherein said plurality of warning means includes a vibration producing means and an audible sound producing means.

12. A device as claimed in claim 11, wherein said vibration producing means is a motor and said audible sound producing means is a speaker.

13. A device as claimed in claim 1, wherein said electronic display is located on said front panel of said device.

14. A device as claimed in claim 1, wherein said electronic display means is a liquid crystal display having a plurality of informational readouts.

15. A device as claimed in claim 14, wherein said plurality of informational readouts comprises: a range readout that registers said distance limit between said device and said companion device selected by said diver with said range push-button switch; an active alarm readout that is activated when said diver with said warning indicator push-button means chooses said warning means from said plurality of warning means; an operating channel readout that registers said operating channel selected by said diver with said operating channel push-button switch; a direction readout that registers a direction indication for said companion device and said companion diver; and a low-battery readout that becomes visible when said electric current from said electric power source diminishes to a predetermined level.

16. A device as claimed in claim 1, wherein said plurality of transmitter/receiver pairs is comprised of: a first transmitter/receiver pair located on said front panel; a second transmitter/receiver pair located on said top panel; a third transmitter/receiver pair located on said bottom panel; a fourth transmitter/receiver pair located on said left side panel; and a fifth transmitter/receiver pair located on said right side panel.

17. A device as claimed in claim 1, wherein said electric power source is comprised of a plurality of coin-cell batteries.

18. A device as claimed in claim 1, wherein said microcontroller circuit includes: a microcontroller; a LCD driver; a vibration indicator circuit; an electronically erasable programmable read only memory (EEPROM); a four bit binary counter; a DC to DC converter; a plurality of toggling pins; said plurality of batteries; an audible alarm circuit; said liquid crystal display; said power push button switch; said range-push button switch; said warning indicator push-button switch; and said operating channel push button switch.

19. A device as claimed in claim 1, wherein said transceiver circuit includes a transmitter section and a receiver section, said transmitter section comprising an operational amplifier and a plurality of piezoelectric transmitters and said receiver section comprising a plurality of piezoelectric receivers, an analog multiplexer, a plurality of operational amplifiers, and a switched capacitor band pass filter.

20. A device as claimed in claim 18, wherein said microcontroller generates a carrier frequency upon which is encoded a first number for identifying said device and a second number for identifying said companion device.

21. A device as claimed in claim 18, wherein said LCD driver is in electrical communication with said microcontroller and said liquid crystal display and controls said range readout, said active alarm readout, said operating channel readout, said directional readout and said low-battery readout.

22. A device as claimed in claim 18, wherein said vibration indicator circuit is in electrical communication with said microcontroller and is comprised of said motor, a vibration indicator circuit diode and a vibration indicator circuit resistor.

23. A device as claimed in claim 18, wherein said audible alarm circuit is in electrical communication with said microcontroller and is comprised of said speaker and a audible alarm circuit resistor.

24. A device as claimed in claim 18, wherein said EEPROM is in electrical communication with said microcontroller and said LCD driver and stores said distance limit selected with said range push-button switch, said warning means chosen with said warning indicator push-button switch, and said operating channel selected with said operating channel push-button switch.

25. A device as claimed in claim 18, wherein said four bit binary counter is in electrical communication with a master clock and said microcontroller and divides a master clock frequency to a reduced clock frequency and said reduced clock frequency is used to set up a sampling rate for said adaptive bandpass filter.

26. A device as claimed in claim 18, wherein said DC to DC converter is in electrical communication with said batteries, said power push-button switch, said transceiver circuit, said microcontroller, said LCD driver and said EEPROM.

27. A device as claimed in claim 19, wherein said DC to DC converter and said microcontroller boost a battery voltage provided from said batteries to a regulated voltage, said regulated voltage being employed to energize said transceiver circuit.

28. A device as claimed in claim 19, wherein said operational amplifier of said transmitter section amplifies a carrier signal generated by said microcontroller and said plurality of piezoelectric transmitters convert said carrier signal to a sound wave, said sound wave being propagated to a plurality of companion device receivers in said companion device of said companion diver.

29. A device as claimed in claim 19, wherein said plurality of piezoelectric receivers convert a sound wave propagated from a plurality of companion device transmitters into an electrical signal, said analog multiplexer and said microcontroller cooperate to connect said electrical signal to said plurality of operational amplifiers, said plurality of amplifiers cooperate with said band pass filter to convert said electrical signal into a digital signal for said microcontroller to convert.

30. A device as claimed in claim 18, wherein said microcontroller employs a computer program to control said device, said program is comprised of a plurality of commands for said device: to activate said speaker, said motor, said range read out, said active alarm readout, said operating channel readout, said direction readout and said low-battery readout; to read said distance limit, said warning means, and said operating channel stored on said EEPROM; to enter a new selection for said distance limit, said warning means, and said operating channel to be stored on said EEPROM; to query said companion device to confirm its presence and to determine its identity; to poll said companion device by sending out a stream of ultrasonic pulses from said plurality of piezoelectric transmitters of said device; and to poll said plurality of piezoelectric receivers of said device for a companion device ultrasonic pulse emitted from said companion device.

* * * * *